June 17, 1941.    H. V. PUTMAN    2,246,318
POWER TRANSFORMER
Filed Aug. 11, 1939    7 Sheets-Sheet 2

WITNESSES:
E. A. McCloskey.

INVENTOR
Henry V. Putman.
BY
Franklin E. Hardy
ATTORNEY

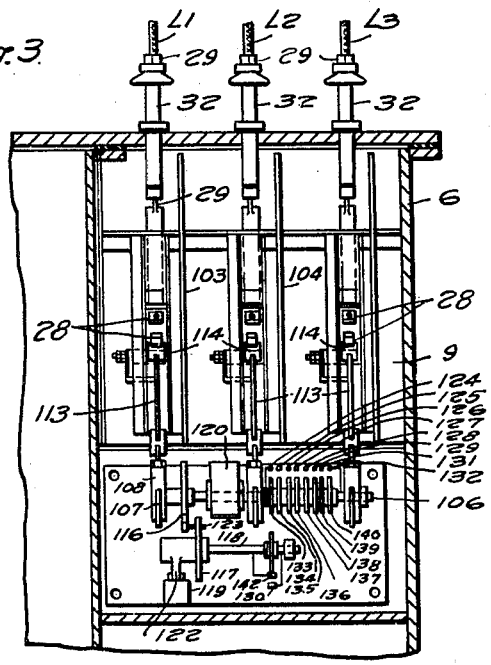
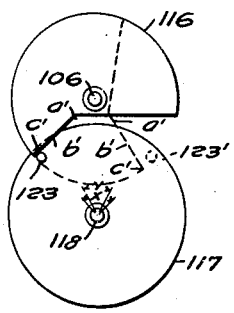
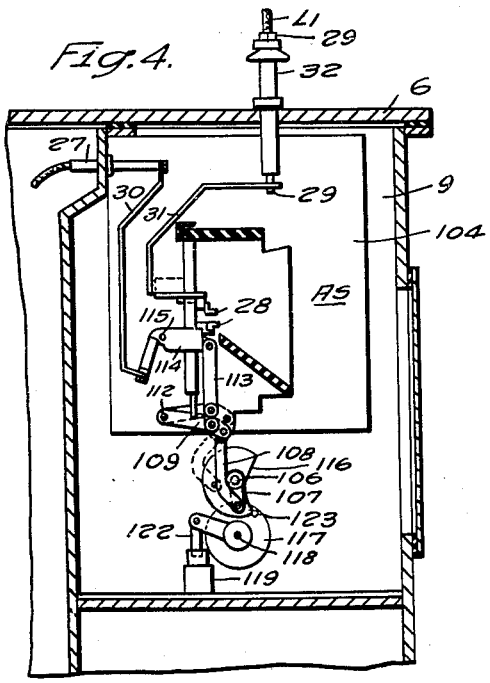

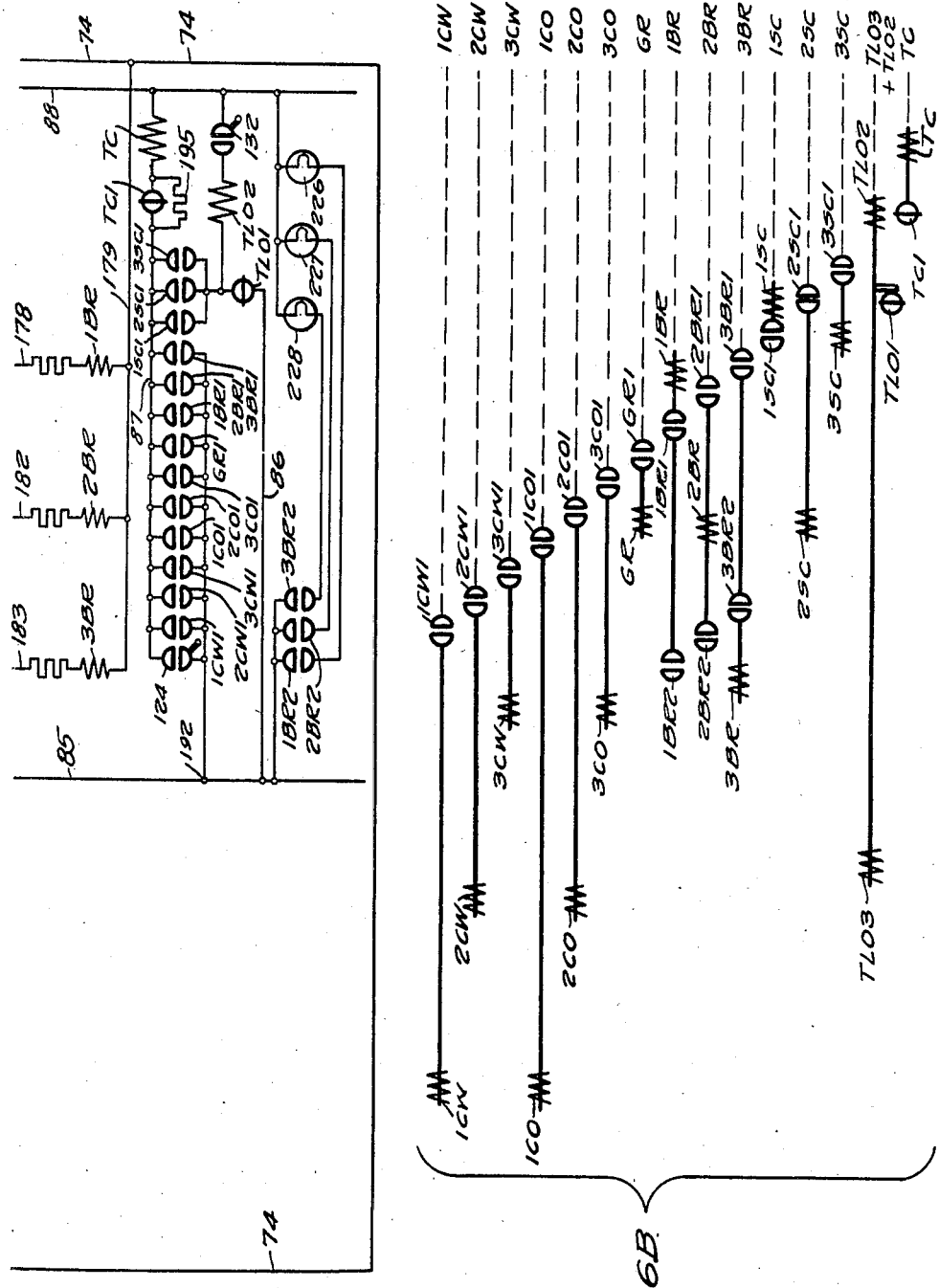

June 17, 1941.   H. V. PUTMAN   2,246,318
POWER TRANSFORMER
Filed Aug. 11, 1939   7 Sheets-Sheet 6
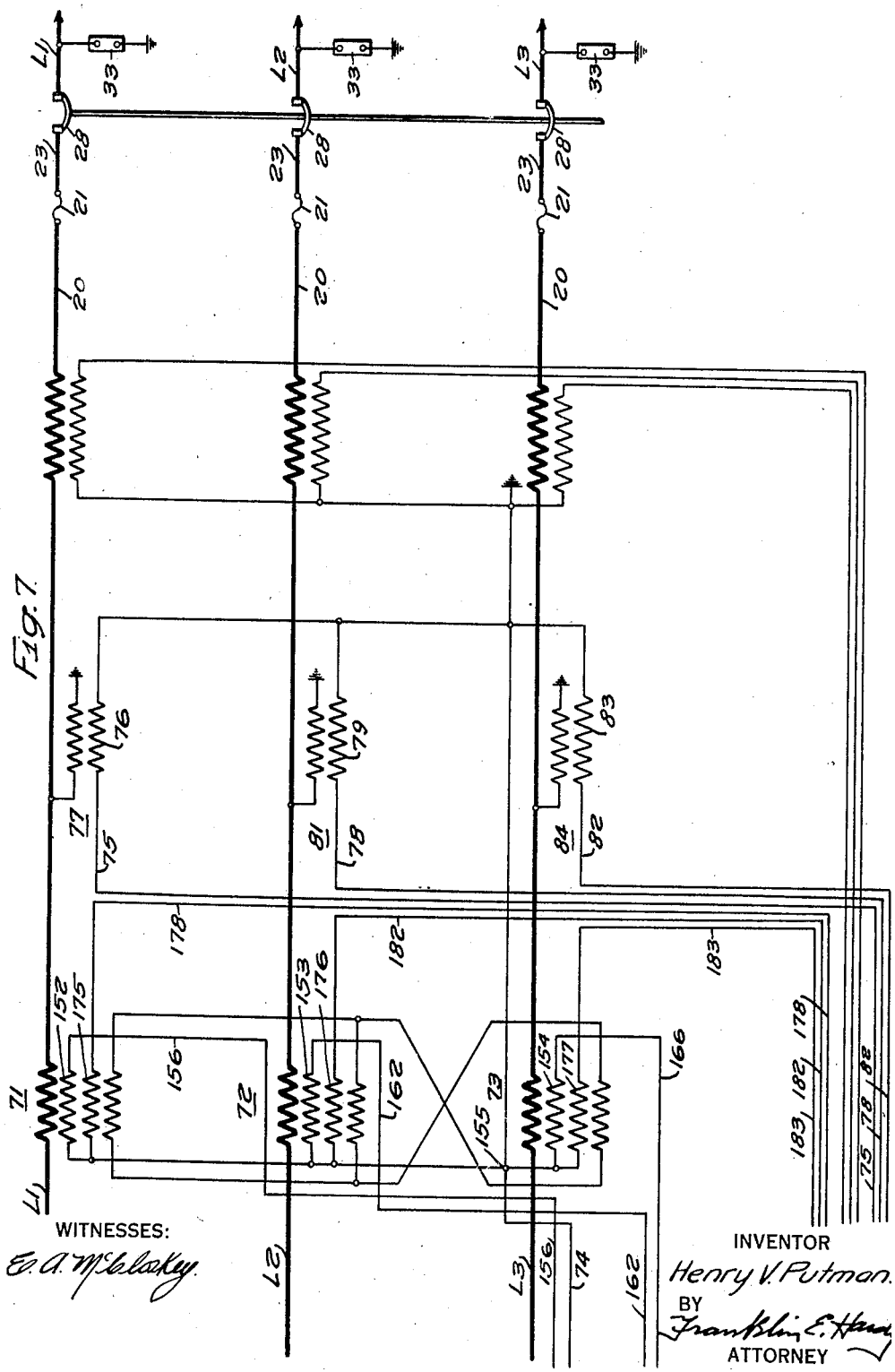
WITNESSES:
E. A. McCloskey.
INVENTOR
Henry V. Putman.
BY
Franklin E. Hare
ATTORNEY

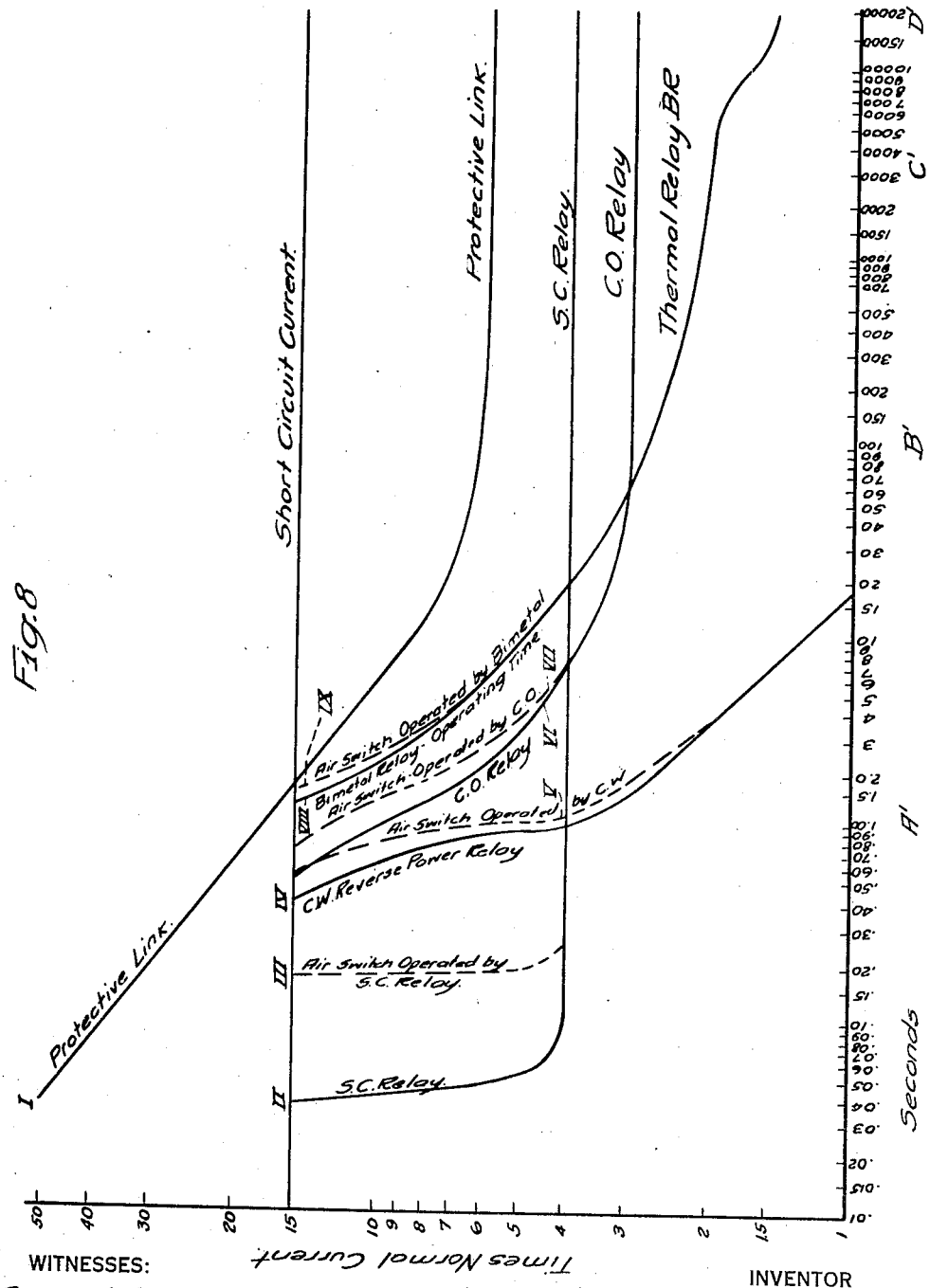

Patented June 17, 1941

2,246,318

UNITED STATES PATENT OFFICE 2,246,318

POWER TRANSFORMER

Henry V. Putman, Sharon, Pa., assignor to Westinghouse Electric & Manufacturing Company, East Pittsburgh, Pa., a corporation of Pennsylvania Application August 11, 1939, Serial No. 289,562

9 Claims. (Cl. 175—294)

My invention relates to power transformer substation installations for use in polyphase power systems for stepping down the transmission line voltage to the feeder or primary distribution circuit voltage.

It is customary to provide substations in power systems for stepping down the transmission line voltage, which may be in the general range of from 22,000 to 110,000 volts, or higher, to a suitable voltage for use on the feeder or primary distribution circuit, which may be of the order of 16,000 volts or less, and from which value it is again stepped down to a secondary distribution circuit voltage for supply to the customer, the secondary distribution circuit voltage being in the order of 110 volts. The power transformer substations for supplying the primary distribution circuit are generally in the range of from 500 kva. capacity to 28,000 kva. capacity and employ three-phase transformers provided with tap-changing equipment for voltage regulation, and also provided with lightning and overload protective equipment. The distribution transformers for supplying the secondary or customer's supply circuit are usually single-phase transformers of much lower power capacity ranging from a few kilowatt capacity upward according to the customer's requirements.

It is necessary to protect the transformer insulation against damage from lightning surges, and also against damage that may be caused by abnormally high current on the primary distribution circuit, such as may be caused by a short circuit, a fault current, or by a continued high power consumption. Currents above normal full load value may be permitted for limited times depending upon their intensity; those of high current value being permitted for short intervals of time only, while those of less current value may be permitted to continue for a longer time interval before it becomes necessary to interrupt the circuit. It is necessary to also protect the transformer from line to ground circuit faults, from single-phase or polyphase faults, and from internal short circuits within the transformer.

It is customary to provide a substation building for housing much of the electrical apparatus provided for a transformer substation, the several parts being distributed about the building over a considerable area. Such apparatus may include high-voltage lightning arresters and standard protective gaps for lightning protection on both the high-voltage and low-voltage terminals of the station, a high-voltage circuit breaker, a stepdown or main transformer, a tap-changing or regulating transformer automatically controlled to maintain the desired feeder voltage, a low-voltage circuit breaker, together with the automatic control equipment responsive to overload conditions on the power circuit, and necessary metering and testing equipment.

In the copending application Serial No. 181,380, filed December 23, 1937, by Franklin L. Snyder, for Power transformers, and assigned to the same assignee as this application, a transformer was disclosed for outdoor installation combining in one tank apparatus formerly required to be housed in a substation building. In the equipment disclosed in that application, a circuit breaker was provided for interrupting the secondary or low-voltage circuit in accordance with the operation of control mechanism therefor, the control mechanism including a plurality of different types of relays operative in response to varying circuit conditions, the several types of relays being coordinated in respect to time to give the maximum of protection to the apparatus with a minimum of interruption of service. In that installation, fusible links were provided on the high-voltage side of the transformer for interrupting the flow of power therethrough in the case of a short circuit between the turns of the transformer windings or between any other parts within the transformer tank, but could not be controlled by the low-voltage circuit breaker and also to protect the transformer equipment in case of failure of the low-voltage circuit breaker to open for any reason.

Upon further study of the problems involved, it has been found that a further protective feature is desirable in certain situations. It is possible for a very heavy lightning stroke to hit the low-voltage line close to the transformer and for more than one stroke to hit at very short time intervals apart. It is also possible in certain installations for the high-voltage line conductors to drop from their suspended positions upon the low-voltage conductors due to failure that might result from a lightning stroke, thus bringing the full high-voltage potential to ground across the low-voltage winding. If for any reason in either of these events a single-phase fault to ground from a low-voltage conductor occurs, and the circuit breaker fails to operate for any reason, the current through the protective links in the high-voltage circuit may not be sufficient to interrupt the circuit before excessive heating and burning of the low-voltage winding has taken place.

It is an object of my invention to provide a power transformer substation installation of the character indicated in which the arrangement of the parts is simplified to provide an efficient and economical substation, and in which the elements of the protective system are so coordinated as to insure the greatest protection to the apparatus with the least possible interruption of service.

It is a further object of the invention to provide a transformer installation in which the low-voltage windings are adequately protected against single-phase secondary faults.

Other objects and advantages of my invention will be apparent from the following description of one preferred embodiment thereof, reference being had to the accompanying drawings, in which:

Figures 1, 2, 3 and 4 are layout or outline views showing the arrangement of the several parts of apparatus arranged in accordance with one preferred embodiment of the invention—Figure 1 being taken along the line I—I of Fig. 2; Fig. 2 being a horizontal sectional view on line II—II of Fig. 1; Fig. 3 being a sectional view taken along the line III—III in Fig. 2; and Fig. 4 being a portion of the sectional view taken along the line IV—IV in Fig. 2;

Fig. 4A is a detail of the cam mechanism employed in the circuit breaker illustrated in Figs. 3 and 4;

Figure 6:
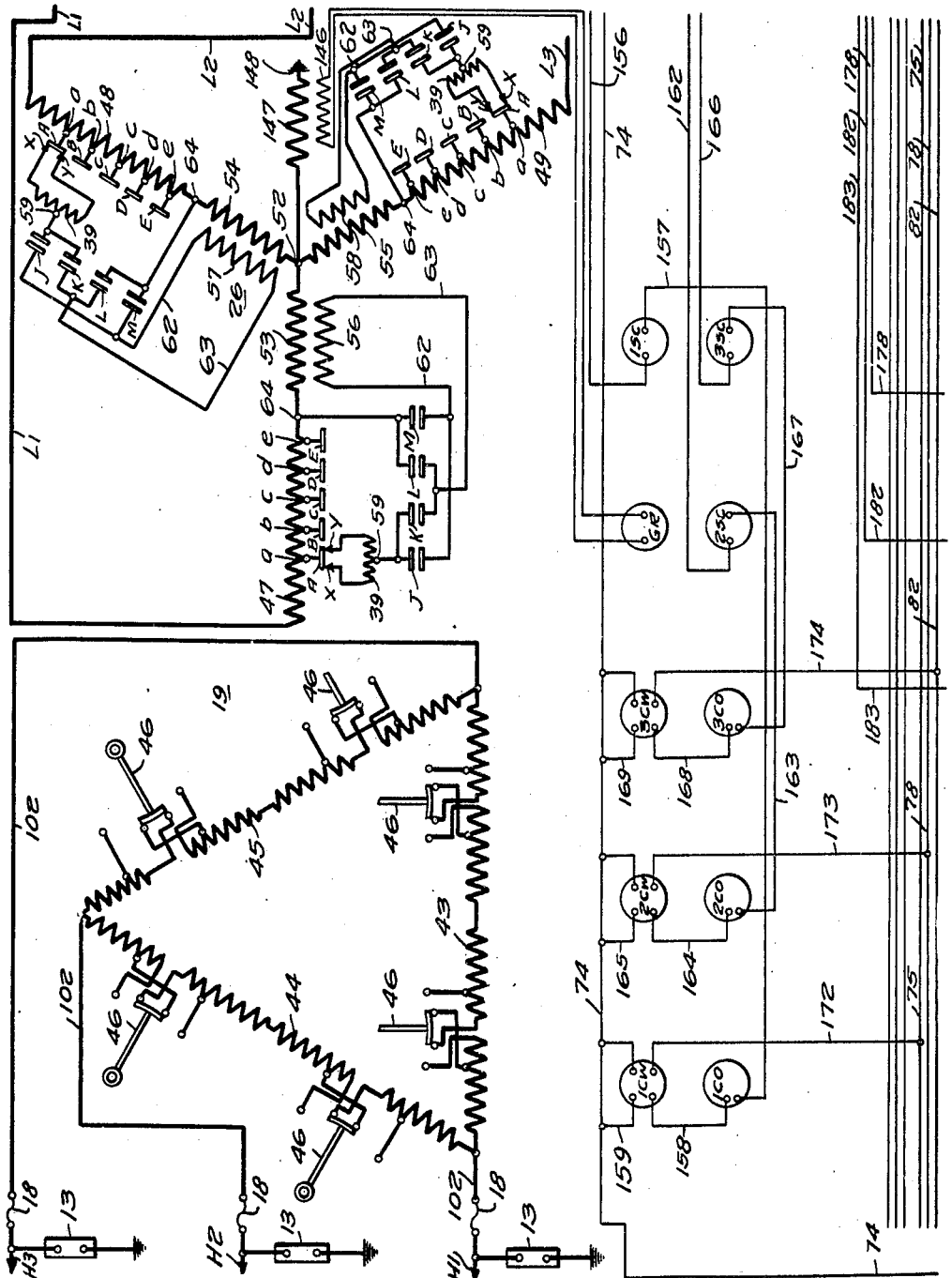

Figs. 6, 6A and 7, when placed with Fig. 7 to the right of Fig. 6 and Fig. 6A below Fig. 6, together form a straight line diagrammatic view of the circuits and apparatus employed in the illustrated embodiment of the invention;

Fig. 6B is a key figure showing the mechanical connections between the several contacts and their operating mechanism that are shown in Figs. 6 and 6A; and Fig. 8 is a chart showing the time coordinated relation of the several control elements of the protective system.

In a transformer installation in accordance with the invention, a single tank structure 6 is provided, and is divided into four compartments (see Figs. 1, 2, 3 and 4)—a power transformer compartment 7 that extends from the top to the bottom of the tank and which contains the several transformer windings together with their associated core structures; a chamber 8 containing the tap-changing equipment that extends across approximately one-half the front of the tank and from the top of the tank approximately halfway toward the bottom; a chamber 9 containing the low-voltage circuit breaker switch that extends from the top of the tank halfway toward the bottom across the remaining portion of the front of the transformer tank; and a control chamber 12 extending entirely across the front of the tank below the chambers 8 and 9, and which contains the necessary control equipment for operating both the tap-changing mechanism and the circuit breaker mechanism.

Figure 2:
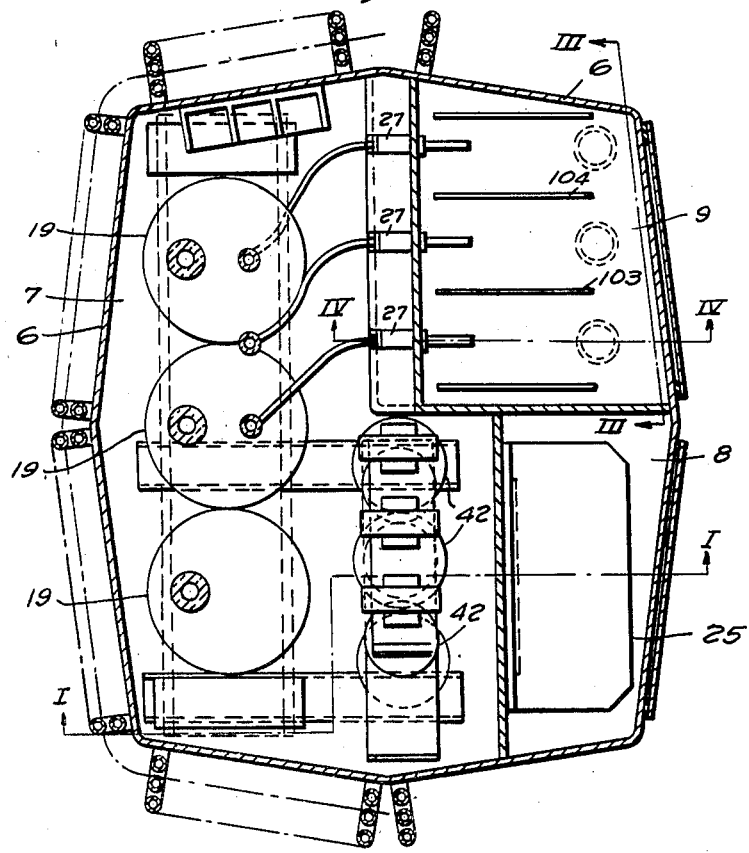

High-voltage lightning arresters are mounted directly on the transformer tank, as shown at 13, the high-voltage terminals represented by conductor H1 being connected directly to the terminal 14 of the lightning arresters, and the lower terminals of the lightning arresters being grounded on the transformer tank at 15. The conductor H1, illustrated as one of three high-voltage conductors, is connected to a bushing stud 16 connected through the high-voltage bushing 17, which extends into the transformer tank, and on the lower end of which is provided a protective link 18, shown in detail in Fig. 5, for connecting one phase conductor of the incoming power line to one terminal of the high-voltage windings of the main transformer 19, which, as shown in Fig. 2 and diagrammatically in Fig. 6, constitutes three sets of inductively related windings corresponding to the three phases of a three-phase system. The other phase conductors H2 and H3 are similarly connected to the corresponding phase windings of the main transformer.

The terminals of the low-voltage winding of the transformer 19 are connected through conductors 20, a protective link 21 carried by a support 22, extending from the cover of the tank, and positioned below the oil level, through conductor 23 and bushing 27 (see Figs. 1, 2 and 4) into the circuit breaker switch chamber 9, the output circuit to the low-voltage line conductors being completed through the contact members 28 of the circuit breaker AS and through the bushing studs 29 of low-voltage bushings 32 to the respective low-voltage circuit conductors L1, L2 and L3. The low-voltage winding of the transformer 19 is provided with a plurality of tap connections 24 which connect together tap switches A, B, C, D, etc., of the tap-changing mechanism, indicated generally at 25, within the chamber 8 and connected through appropriate tap switches to the primary windings of a series transformer 26, the three-phase windings of which are mounted beside the transformer 19 and clearly shown in Figs. 1 and 2. Lightning arresters 33 are mounted on top of the transformer tank beside the low-voltage terminal bushings 32 between each phase of the low-voltage circuit conductor and ground. Auxiliary apparatus, such as current transformers 35 and 36, preventive autos 39, potential transformers 42 and thermal relays 1BR, 2BR and 3BR, are mounted on the main transformer frame and are movable therewith as a single unit.

The arrangement of the various parts of the apparatus and their control circuits will be best understood by reference to Figs. 6, 7 and 6A, which, taken together, constitute a single diagram when Fig. 7 is positioned to the right of Fig. 6; and Fig. 6A is positioned below Fig. 6. Starting at the left of Fig. 6, the three-phase conductors H1, H2 and H3 represent the three incoming transmission line conductors of a three-phase system, between each of which and ground the lightning arresters 13 are connected and in circuit with which the protective links 18 are connected. The three-phase conductors H1, H2 and H3 are connected to supply energy to the high-voltage windings 43, 44 and 45 of the transformer 19, the three-phase windings being illustrated as connected in delta and provided with manually operable no-load tap-changing switches 46, two such switches being provided in each phase winding. The low-voltage windings 47, 48 and 49 are inductively related to the high-voltage windings 43, 44 and 45, respectively, and are connected to a neutral point 52 through the secondary windings 53, 54 and 55, respectively, of the three-phase series transformer 26, the primary windings 56, 57 and 58 of which are connected to their respective low-voltage windings 47, 48 and 49 of the main transformer through tap-changing switch mechanisms to be later described. The terminals of the low-voltage windings 47, 48 and 49 are connected, respectively, to the low-voltage circuit conductors L1, L2 and L3 through the protective links 21 and the contact members 28 of the circuit breaker AS.

Tap-changing equipment

The no-load tap-changing equipment for the high-voltage windings comprises the several switches 46 for changing the effective number of turns in the high-voltage windings 43, 44 and 45. They are manually operated under conditions of no-load on the transformer. The tap-changing or regulating equipment LTC for the low-voltage windings 47, 48 and 49 is automatically operated under load conditions for varying the voltage delivered to the circuit conductors L1, L2 and L3. The structural features of the particular mechanism employed for operating the regulating tap-changer equipment is not here illustrated and described in detail, as it may be any one of a number of known motor-operated tap-changing mechanisms, such as that disclosed in United States Patent No. 2,036,305, issued to Franklin L. Snyder on April 7, 1936, for Regulating equipment, and assigned to the same assignee as this application. The circuits controlled by the tap-changing equipment are diagrammatically illustrated in Fig. 6. A plurality of taps a, b, c, d and e are provided on each of the low-voltage windings 47, 48 and 49 connected respectively to fixed switch contact members A, B, C, D and E, which cooperate with a pair of movable switch contact members X and Y that are connected, respectively, to the opposite ends of a tap-bridging auto-transformer or preventive auto 39. Reversing switches J, K, L and M are provided, the switches J and K being adapted to connect the middle point 59 of the preventive auto 39 to one of the conductors 62 and 63 that are connected to the opposite terminals of the associated phase primary winding 56, 57 and 58 of the series transformer 26. The reversing switches L and M connect a junction point 64 between the secondary winding of the associated phase of the series transformer and the low-voltage windings 53, 54 and 55, for example, with the one or the other of the conductors 62 and 63.

By operating the switching mechanism in a well known manner, the voltage supplied to the distribution circuit conductors L1, L2 and L3 may be varied in a series of steps to buck or boost the normal induced voltage of the main transformer.

The mechanism for controlling the sequential operation of the several tap-changing switches may be automatically responsive to the voltage of the secondary circuit, which apparatus, being well known and not an essential part of my invention, is not here disclosed in detail.

Protective equipment

Figure 1:
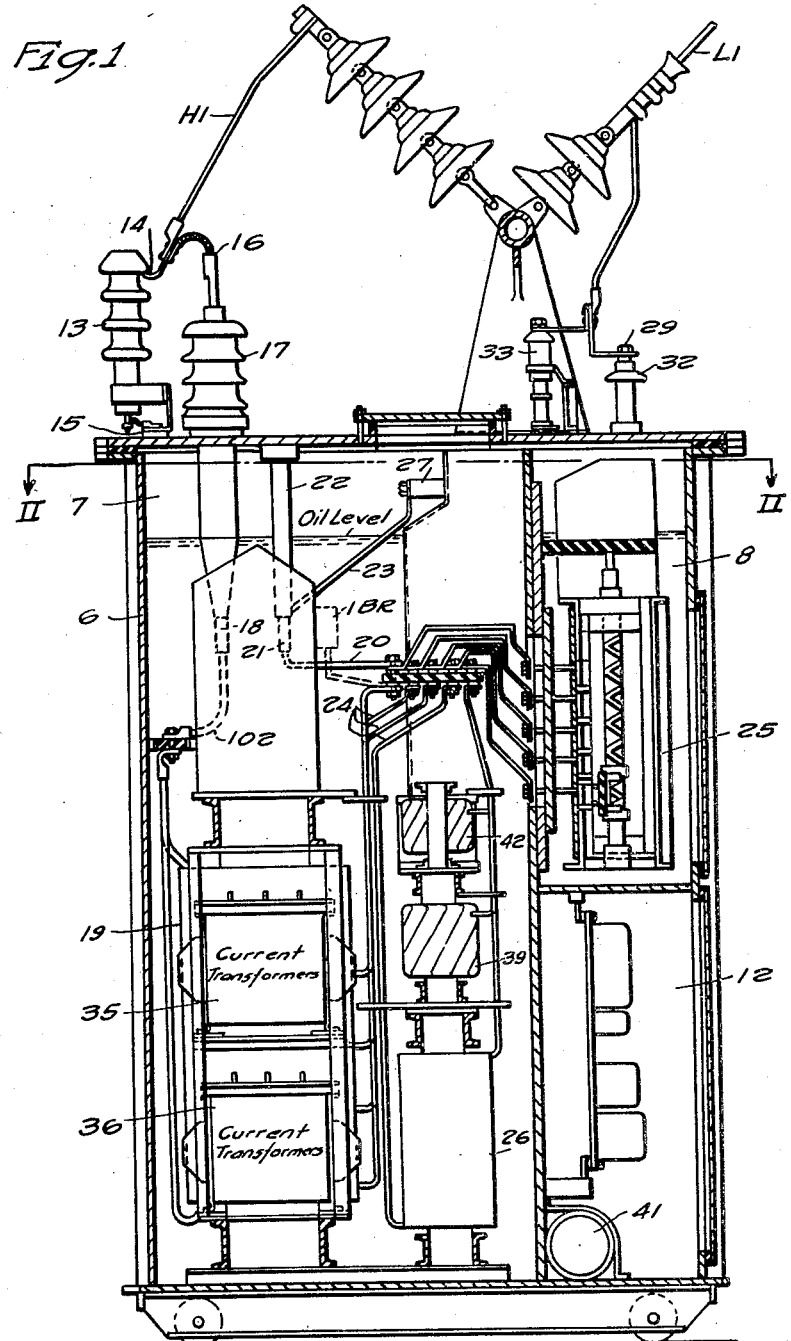

The protective equipment, in addition to the lightning arresters and protective gaps before mentioned, includes the high-voltage protective links 18, positioned as indicated in Fig. 1, on the inner ends of the high-voltage bushings 17, the low-voltage protective links 21 positioned on supports 22, the circuit breaker AS including contact members 28 positioned in the circuit breaker compartment 9, and control equipment for the air switch that is responsive to the various circuit conditions under which it is desired that the switch open.

Figure 5:
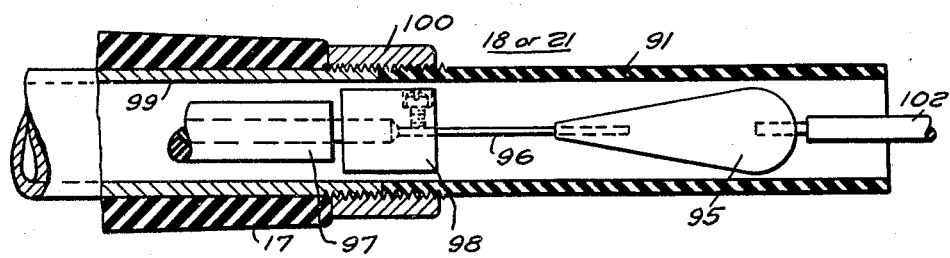
Fig. 5 is a detail of the protective link shown connected in the primary and secondary circuits at 18 and 21, respectively, in Fig. 1.

The high-voltage protective links 18 are designed to protect the transformer against internal faults, such as short circuits, within the transformer tank between parts of the transformer winding, or to interrupt the circuit in case the thermal relays 1BR, 2BR or 3BR and the other protective relays controlling the opening of the circuit breaker AS fail to operate. The protective links 18 that are connected in circuit with the high-voltage conductors supplying energy to the high-voltage windings of the transformer, and the protective links 21 that are connected in circuit with the low-voltage windings may be of any suitable construction employing a fuse element that is heated by an excess of current flowing therethrough, and will correspond in principle to the disclosure in a copending application of J. K. Hodnette, Serial No. 167,040, filed October 2, 1937, for Protective devices for electrical apparatus and systems, assigned to the same assignee as this application. The protective link is best shown in Fig. 5, and comprises a fibre tube 91 enclosing a pellet 95 and a fusible wire 96 connected between the pellet and the conductor of an insulated cable 97 that extends through the central opening in the bushing 17. A connecting block 98 is provided for connecting the fusible wire 96 to the cable. A brass collar 100 is provided for coupling the fibre tube 91 with a tube 99 extending through the bushing 17. In the link 18 the lower end of the pellet 95 is connected to the conductor of an insulated cable 102 which passes beneath the oil to the high-voltage winding of the transformer and the lower end of the link 21 is similarly connected by cable 20 to the low-voltage winding. A protective link of the character described is provided on each of the three high-voltage bushings 17 between each of the three high-voltage circuit conductors H1, H2 and H3 and the associated phase windings of the main transformer and between each of the low-voltage circuit conductors L1, L2, and L3 and the corresponding low-voltage phase winding. When the current passing through the fusible wire 96 becomes greater than the current carrying capacity of the wire, the wire melts causing an arc to be formed between the two parts thereof, generating gases which act on the pellet 95 to force it out of the tube 91 with a high velocity. This rapid expulsion of the pellet from the tube lengthens the arc rapidly and draws it into the main body of oil, thus quenching the arc in a few cycles. It will be noted by reference to Fig. 1 that the protective links 18 and 21 are positioned beneath the surface of the oil in which the several parts of the transformer equipment is immersed in the chamber 7.

Circuit breaker

The circuit breaker employed in this assembly may be any suitable circuit breaker adapted for operation to suit the service required and may be either motor-operated or solenoid-operated. The circuit breaker is provided with a number of cam switches that interlock its functioning with the breaker control system hereinafter described. Referring to Figs. 3 and 4, three pairs of contact members for interrupting the current through each of the three phases of the system are provided which may be separated by appropriate barriers 103 and 104, and each of which are controlled by a like mechanism in accordance with the movement of a shaft 106 carrying a crank arm 107, which, when moved clockwise, as viewed in Fig. 4, raises the rods 108 from their full-line to their dotted-line positions, moving the links 109 upwardly about fixed pivot points 112 and raising the lift rods 113 carrying the lower one of the switch contact members 28 upwardly to engage the upper switch contact member. The lower contact member 28 is spring mounted in a well known manner on the contact arm 114 that is adapted to pivot about the pin 115. A cam 116 is provided connected on the shaft 106 and cooperates with a cam 117 carried by a shaft 118 that is rotated by a closing solenoid 119 to operate the switch to its circuit closing position. The switch may be held in its circuit closing position by a spring actuated brake 120 that is normally held in its set or brake applying position by a spring (not shown) that is released, in a well known manner, upon the energization of a brake winding or trip coil TC shown in Fig. 6A and which will be more fully described at a later time. A latch may be substituted for the brake and held in its latched position by a spring and moved to its unlatched position by a magnet. The trip coil for tripping the latch need not be maintained energized after release thereof.

The operation of the circuit breaker cams 116 and 117 will be better understood by reference to Fig. 4A in which the cams are shown in their full-line position just prior to the end of the closing cycle of operation. The dotted lines show the position of the cams when the circuit breaker is open, the pin 123 carried by the cam 117 being shown in dotted lines at position 123'. Upon the energization of the operating solenoid 119 (Figs. 3 and 4), the arm 122 connected thereto rotates the shaft 118 in a counterclockwise direction, causing the pin 123 to move from its dotted line position at 123' and engage the surface of cam 116 in the dotted line position between the points $a'$ and $b'$ in Fig. 4A to rotate the cam 116 in a clockwise direction, thus raising the lift rods 108 and bringing the lower contact members 38 into engagement with the upper contact members. When the cam 116 is in the substantially closed position of the circuit breaker during which the pin 123 passes from the point $b'$ to the point $c'$ on the surface of the cam 116, the cam switch 124 opens, deenergizing the coil TC of the brake 120 and applying the brake to the shaft 106 to maintain the switch in its circuit closing position. When a latch is used instead of a brake, the switch 124 may be omitted since it is not necessary to maintain the trip coil TC energized after the latch has been moved to its unlatched position. It will be noted that during the movement of the pin 123 from point $b'$ to point $c'$ on the surface of the cam substantially no motion of the shaft 106 takes place.

Cam operated switches 124, 125, 126, 127, 128, 129, 131 and 132 are provided to be actuated by cams 133 to 140, respectively, carried by the shaft 106. Cam switches 124, 125, 126, 128, 129 and 132 are open when the circuit breaker AS is closed and closed when the circuit breaker is open, and cam switches 127 and 131 are closed when the circuit breaker is closed and open when the circuit breaker is open. A cam switch 130 is also provided, that is, actuated by a cam 142, carried by the shaft 118, and is closed during a portion of the movement of the shaft 118 to close the circuit breaker. It will be noted by reference to Figs. 3, 4 and 4A that upon the completion of the closing operation above described and the subsequent deenergization of the closing coil 119, the cam 117 and shaft 118 return immediately to the position in which the pin 123 is shown in dotted outline at 123'. The cam 117, therefore, does not interfere with the opening of the circuit breaker which takes place immediately upon the energization of the tripping coil TC to release the brake 120 and to effect the opening of the breaker due to the combined force of throw-out springs and gravity action upon the movable mechanical parts.

*Circuit breaker control equipment*

The circuit breaker control equipment for effecting operation of the circuit breaker AS is arranged to open the switch upon either overload current, high temperature on the transformer, excessive ground current or reverse power flow in the system. Substantially instantaneously operated over-current relays 1SC, 2SC and 3SC are provided to be responsive, respectively, to overload currents of a predetermined value in each of the three low-voltage phase conductors. These relays may be of the type known to the trade as "Type SC" relays of Westinghouse Electric & Manufacturing Company manufacture, which have a plunger contact having a definite operating time for any current higher than the trip setting of the relay. Three inverse time relays 1CO, 2CO and 3CO are also provided for overload tripping operation, which may be what is known to the trade as the "Type CO" relay of Westinghouse Electric & Manufacturing Company manufacture, the inherent characteristic of which is that it operates at varying intervals of time depending upon the intensity of the overload current, slower for low overload currents and faster for larger current values. The Type CO relays may be set to operate at a lower ultimate current value, as shown in curves in Fig. 8, in which the CO relays operate at any current value above three times normal at varying time intervals, and the SC relay is indicated in that figure as operating substantially instantaneously for any current values above four times normal full load current. Three reverse power relays indicated as 1CW, 2CW and 3CW are also provided for the three phase conductors L1, L2 and L3, respectively, for opening the circuit breaker AS upon a reverse power flow of some predetermined value, say 10% normal full load, in any one of the three phases of the system. An overcurrent relay GR is also provided connected to the secondary winding 146 of a "ground" transformer, the primary winding of which is connected between the neutral point 52 and ground at point 148. The relay GR is effective to open the circuit breaker AS for some predetermined value of neutral to ground current determined by the setting of the relay. The several SC, CO and CW type relays are energized from circuits extending from the secondary windings 152, 153 and 154, respectively, of the current transformers 71, 72 and 73, one end of each of these windings being connected through junction point 155 to a neutral return conductor 74, the opposite ends thereof being connected to separate phase conductors 156, 162 and 166, respectively. A circuit from the secondary winding 152 of the current transformer 71 associated with distribution circuit conductor L1 extends from one terminal of the winding 152 through phase conductor 156, the winding of relay 1SC, conductor 157, the winding of relay 1CO, conductor 158, the current winding of the reverse power relay 1CW, conductor 159 and to the neutral return conductor 74 back to the opposite terminal of the secondary winding 152. A circuit from the secondary winding 153 of the current transformer 72 associated with the distribution line conductor L2 extends from one terminal of the winding 153 through conductor 162, the winding of relay 2SC, conductor 163, the winding of relay 2CO, conductor 164, the current winding of relay 2CW, conductor 165 to the neutral return conductor 74, and back to the opposite terminal of the secondary winding 153. A circuit from the secondary winding 154 of the transformer 73 associated with the distribution circuit conductor L3 extends from one terminal of the winding 154 through conductor 166, the winding of the relay 3SC, conductor 167, the winding of relay 3CO, conductor 168, the current winding of the relay 3CW, conductor 169 to the neutral return conductor 74 back to the opposite terminal of the winding 154. The reverse power relays CW each have a current winding connected as above described, and a voltage winding, the voltage winding of the relay 1CW being connected between the neutral return conductor 74 and conductor 172 that is connected through the voltage phase conductor 75 to the secondary winding 76 of the potential transformer 77 associated with line conductor L1. The voltage winding of the reverse power relay 2CW is connected between the neutral return conductor 74 and conductor 173 that is connected through the voltage phase conductor 78 to the secondary winding 79 of the transformer 81 associated with line conductor L2. The voltage winding of the reverse power relay 3CW is connected between the neutral return conductor 74 and conductor 174 with the voltage phase winding 82 leading to the secondary winding 83 of the potential transformer 84 associated with the distribution circuit conductor L3. It will be noted that each of the three relays 1SC, 1CO and 1CW is associated functionally with conditions in one phase of the three-phase circuit; the three relays 2SC, 2CO and 2CW is associated with the second phase of the three-phase circuit; and the three relays 3SC, 3CO and 3CW is associated with the third phase of the three-phase circuit. The operation of any one of these relays initiates the opening of the circuit breaker AS and starts the operation of a reclosing circuit breaker mechanism, the operation of which will be presently described.

In addition to the above-enumerated relays, thermal relays 1BR, 2BR and 3BR are provided, the location of which is shown in Fig. 1 as being below the surface of the transformer oil. These thermal relays are responsive to the combined temperature of the oil and the temperature of the heating coils 1BR, 2BR and 3BR shown in Fig. 6A, and which are heated in accordance with the current flowing respectively in the three phase conductors L1, L2 and L3. The thermal relays may be of the type known to the trade as "Type TR" Westinghouse circuit breakers. Each of the three current transformers 71, 72 and 73 is provided with a secondary winding 175, 176 and 177, respectively, the three windings being connected to the before-mentioned neutral return conductor 74 at the junction point 155. The winding 175 is connected by conductor 178 through the heating coil 1BR, conductor 179 to the return neutral conductor 74. The current transformer secondary winding 176 is connected by conductor 182 through the heating coil of the thermal relay 2BR, and conductor 179 to the neutral return conductor 74, and the current transformer secondary winding 177 is connected by conductor 183 through the heating coil of the thermal relay 3BR, conductor 179 and return neutral conductor 74. The several thermal responsive elements of these several relays are heated both by the transformer oil and by their respective heating coils which respond to the current flowing through their respective phase conductors.

Before describing the operation of the circuit breaker in response to the several control relays, it will be helpful to note the coordinated relation in timing between the several circuit-interrupting control elements as shown on the chart in Fig. 8, in which the vertical axis represents current values in times normal current from 1 to 50, that is, from normal current to fifty times normal current, and the abscissa represents time in seconds. It will be noted that the scale used is a logarithmic scale, and that the distance from the left of the chart to the point A' is expressed in hundredths of a second. The point A' indicates a time of one second, the point B' represents sixty seconds or one minute, point C' thirty-six hundred seconds or one hour, and the point D' twenty thousand seconds or approximately five and one-half hours. The curve I indicates the time required to fuse the protective link for current values of from fifty times normal down to approximately six times normal, lesser currents not being sufficient to fuse the link. In the example illustrated in the chart, it is assumed that short-circuit current is fifteen times normal current. The curve II indicates the time required for one of the "SC" type relays to operate, and the curve III the time of opening of the circuit breaker AS when opened by one of the "SC" type relays. It will be noted that the "SC" relays open substantially instantaneously for all values of current between short-circuit current down to four times normal full-load current. If the current in the feeder circuit is sufficient to trip an "SC" relay, it will do so in a few hundredths of a second regardless of the particular current value. The curve IV indicates the time required to operate any one of the reverse power relays "CW", and the curve V indicates the time of opening the switch AS when tripped by one of the reverse power relays. The curve VI indicates the time of operation of any one of the "CO" type over-current relays, and the curve VII indicates the time of opening the circuit breaker by any of these relays. The curve VIII indicates the time of operating of any of the thermal relays BR, and the curve IX the time of opening the switch by operation of the thermal relays.

It will be noted that the "CO" type relay causes an opening of the circuit breaker AS at varying times depending upon the current values, these varying from something less than one-half a second for short-circuit current to nearly a minute for a current of three times normal value, below which value the relay does not trip. The thermal relays, as indicated in curve VIII, will trip at a variable time shown as slightly over one second for short-circuit current to approximately one minute for three times normal current, and that these relays will trip the circuit breaker for lesser degrees of current down to 50% overload or 1.5 times normal current at approximately five and one-half hours.

It will be noted that for comparatively low overload current values, the overload will be carried a substantial interval of time before the thermal relay trips the breaker to prevent too great heating of the transformer. It will also be noted that any of the "CO" type relays within the range of current values controlled thereby will trip prior to the thermal relay, and for the "CO" relay will trip the breaker for lower values of current than will the "SC" relay. It will also be noted that the "SC" type relay, for the current values controlled thereby, will trip the circuit breaker switch prior to any of the other relays. Likewise it will be noted that the protective link is the last one of the several circuit-interrupting devices to be operated and will, therefore, operate only upon the failure of all the several other protective relays to operate, or upon the existence of a short circuit within the transformer, such as between the windings thereof, which short-circuit current will flow through the protective link and the high-voltage conductors, but will not flow through the low-voltage conductors to which the several control relays are responsive. For overload current values between three and four times normal full load current, the circuit breaker switch AS will remain closed an appreciable time until one of the "CO" type relays operate to trip the switch.

It is evident from the above discussion that the various relays and protective equipments are so coordinated that the apparatus is completely protected under different types of fault conditions. The basic consideration in protecting the transformer against overload current is determined by the thermal characteristics of the apparatus which fixes the operating curve of the thermal relays. The protective link is so designed that it operates only in case the thermal relays fail or there is an internal fault in the transformer. The type "SC" relay has a very rapid operating time characteristic and is only used for initial operation of the circuit breaker exceeding above four times normal current. Subsequent opening, where a plurality of reclosing operations are provided for in response to the original fault, is controlled by the "CO" relays which also initiate the control for current values below four times normal value, and are timed to operate the circuit breaker switch before the transformer temperature reaches a value sufficient to effect operation of the thermal relays. The type "CW" relays operate only on reverse power flow such as might be effected only where the primary circuit supply is interrupted and a feedback of power through the transformer occurs. The "CW" relays are designed to operate to interrupt the circuit breaker AS for reverse power above 10% normal full-load power. It will be appreciated that the particular current values indicated in the chart of Fig. 8 are illustrative only and that the several relays may be set to operate at different values depending upon the requirements of particular installations. The coordinated relation in the chart respecting the relative times of operation of the several control elements would, however, be maintained.

Referring to Figs. 6, 6A and 6B, and assuming that a fault occurs on the distribution feeder of sufficient value to cause the operation of one of the "SC" type relays, for example, relay ISC. This relay would close its contacts indicated as ISCI on Fig. 6A, closing a circuit from a supply conductor 85 through conductor 86, the relay contact member TLOI, the relay contact member ISCI, conductor 87, the tripping coil contact member TCI, the tripping coil TC of the brake 120, to the supply conductor 88, thus releasing the brake 120 and permitting the circuit breaker switch to open as above described. Upon the release of the brake, the contact members TCI are separated, thus inserting a resistor 195 in series with the tripping coil TC to decrease the continued energization thereof to a value sufficient to maintain the brake in its released position while decreasing the heating effect thereon.

The overload current causing the relay ISC to initiate the operation of the circuit breaker switch AS is interrupted upon the opening of the switch, which causes the several cam switches 124, 125, 126, 127, 128, 129 and 132 to be operated to their closed positions and the cam switches 127 and 132 to be operated to their circuit-interrupting positions. The cam switch 124 in closing maintains a circuit between junction point 192 and conductor 87 in shunt relation to the relay contact member ISCI to insure that the energization of the tripping coil TC is maintained until the circuit breaker is again closed, thus maintaining the brake in its released position to permit closing. The cam switch 132 closes a circuit through conductor 86, toggle relay contact member TLOI and coil TLO2 of the toggle relay to operate the relay to open its contacts TLOI. This relay, being a toggle relay, remains in its last established position until a second coil TLO3 thereof (shown only in Fig. 6B) is energized upon the completion of the operation of the reclosing circuit breaker mechanism. The opening of the toggle relay contacts TLOI prevents an immediate second energization of the trip coil TC after closing the circuit breaker switch AS, which might occur in case the fault causing the first opening of the switch did not clear upon the first opening of the circuit breaker.

The reclosing circuit breaker mechanism which may be employed as a part of the protective equipment causes an immediate reclosing of the circuit breaker after its initial opening by any one of the "SC" type relays, the subsequent reopening of the switch in case the fault is not cleared by the first opening being controlled by the type "CO" relays which causes the circuit breaker to open only after the fault has continued for a predetermined time, as indicated in the chart in Fig. 8; thus the first opening and first closing of the circuit breaker resulting from a single fault takes place promptly while subsequent reopenings take place only after the lapse of a predetermined time following each closing operation. Since the reclosing circuit breaker mechanism is not a part of this invention, it is not disclosed nor described in detail. A full description of the reclosing circuit breaker apparatus and its operation will be found in application Serial No. 181,380, filed December 23, 1937, by Franklin L. Snyder, for Power transformers.

If upon the initial opening and closing of the circuit breaker by the "CS" relay the fault is not cleared, the fault current causes operation of one of the CO relays ICO, 2CO or 3CO at a time interval, as indicated on the chart in Fig. 8, to close the corresponding relay contact member ICOI, 2COI or 3COI shown in Fig. 6A. An instantaneous second operation in the reclosing cycle upon closure of the contacts ISCI of the relay ISC is prevented by the interruption of the circuit therethrough at the relay contact member TLOI as above described. The reenergization of the winding TC through the contact member ICOI again release the brake and permits the switch AS to open, the brake being maintained energized through the cam switch 124 until the next closing operation of the switch is substantially completed.

The reclosing circuit breaker mechanism will operate in response to any fault causing the operation of any of the "SC" type relays, "CO" type relays, "CW" type relays or the GR relay that is responsive to ground current between the neutral point 52 of the low-voltage transformer winding and ground, the reclosing mechanism being operated either to its "reset" or to its "lockout" position when the operation thereof is initiated by the closing of an "SC" type relay.

If an overload of less than three times normal current occurs on the system, or if for any reason any of the relays above described fail to operate in the manner intended to cause operation of the circuit breaker AS, one of the thermal relays IBR, 2BR or 3BR that is responsive to the temperature of the oil and to the heating of the windings of the three phases, respectively, of the transformer, will function to interrupt the circuit breaker AS at times depending upon the current values existing as shown in curve VIII in Fig. 8. Each of the thermal relays IBR, 2BR and 3BR is provided with a pair of contacts IBR2, 2BR2, and 3BR2, respectively that close to operate signal lights 226, 227 and 228, respectively, prior to the heating of the bimetal elements of the relays sufficiently to close their respective contact members IBRI, 2BRI and 3BRI through which the tripping coil TC is energized. The opening of the contact switch AS upon the energization of the trip coil TC takes place in the manner above described, but in this case the corresponding relay contact member IBR3, 2BR3 or 3BR3 connected between the supply conductor 85 and the supply conductor 88 interrupts the circuit for operating the reclosing mechanism so that this mechanism remains in its illustrated or "reset" position, and is not effective to cause the reclosing of the circuit breaker AS.

As previously pointed out, it is the function of the protective links 18 to protect the transformer against internal faults, such as short circuits, which might occur within the transformer between the winding turns and which would not be reflected as faults in the portions of the circuits to which the several relays are responsive. It will be noted, however, that if a fault occurs between a single secondary conductor and ground within the transformer casing, or between those portions of the conductors to which the current and voltage transformers that energize the several relays are connected and the interior of the transformer winding, as might occur from a lightning stroke, or, if for some reason the circuit breaker fails to open in response to the operation of a relay as a result of a fault to ground from a single-phase conductor, this single-phase secondary fault current would not cause an increase in the primary current proportional to the secondary current because of the three-phase delta-star connection. A single-phase short from the secondary terminal to ground will produce a fault current in the primary circuit that is equal to the fault current times normal divided by the square root of 3. In the embodiment of the invention described, I have assumed a transformer in which the short-circuit current at the secondary terminals results in about fifteen times normal current as shown in the curve in Fig. 8. It will also be noted that the primary protective link 18 will withstand six or seven times full-load current continuously. If I divide the short-circuit current of fifteen times normal by the square root of 3 and make some allowance for voltage drop due to the short circuit on the system, it will be noted that the fault current developed in the primary link is barely sufficient to cause it to fuse, and under the conditions mentioned it may be possible for the high-voltage protective link to permit one leg of the three-phase winding to burn out. By the use of protective links 21 in the secondary circuit, as well as the links 18 in the primary circuit, both primary and secondary links having about the same setting in percent of normal current on a polyphase basis, the secondary winding will be protected under the conditions described. Under such conditions, the secondary current through the winding would be that through the protective link or substantially fifteen times normal which would be ample margin to positively interrupt the circuit and protect the winding.

Since modifications in the circuits and apparatus illustrated and described may be apparent to those skilled in the art within the spirit of my invention, I do not wish to be limited otherwise than by the scope of the appended claims.

I claim as my invention:

1. A transformer installation comprising, in combination, a casing, a transformer within said casing having polyphase high-voltage and low-voltage windings, phase conductors extending from the several high-voltage and the several low-voltage windings, fusible links within the casing in circuit with each high-voltage phase conductor for interrupting the circuit therethrough upon a predetermined current flow therethrough, fusible links within the casing in circuit with each low-voltage phase conductor for interrupting the circuit therethrough upon a predetermined current flow therethrough, a circuit breaker within said casing for interrupting the current through the low-voltage winding, and a plurality of devices for causing the operation of the circuit breaker to its circuit interrupting position including a plurality of current responsive relay means connected to operate in response to low-voltage winding circuit current and thermal relay means, said devices being so coordinated that one current relay means operates substantially instantaneously upon a predetermined excess current in the low-voltage circuit to operate the circuit breaker, another current relay means being responsive after a predetermined variable time interval depending upon the current flowing in the low-voltage circuit and including a lesser value of current than that required to trip the first named relay means for operating the circuit breaker, said thermal relay means being operative in response to heating of the transformer apparatus upon continued overload after a predetermined variable time interval of greater duration than the above named means for operating said circuit breaker, and said fusible links requiring a greater increase in excess current than any other circuit controlling device to interrupt the current flow.

2. A transformer installation comprising, in combination, a transformer having polyphase high-voltage and low-voltage windings, fusible links in circuit with the high-voltage winding for interrupting the high-voltage circuit upon a predetermined current flow therethrough, fusible links in circuit with each low-voltage phase winding for interrupting the circuit therethrough upon a predetermined current flow therethrough, a circuit breaker for interrupting the current through the low-voltage winding, and a plurality of devices for controlling the operation of said circuit breaker for interrupting the flow of power through said transformer including an instantaneous current responsive relay connected to operate in response to the low-voltage winding circuit current, a time delay current responsive relay connected to operate in response to the low-voltage winding circuit current, a thermal relay responsive to the temperature of the transformer apparatus, and said fusible links, said several devices being coordinated with respect to time to respond over a predetermined range of overload currents in the order named, the three named relays being operative for controlling the operation of the circuit breaker, the protective links in the high-voltage and low-voltage circuits having substantially the same current carrying capacity in terms of per cent full-load current for the respective circuits.

3. A transformer installation comprising, in combination, a transformer having polyphase high-voltage and low-voltage windings, fusible links in circuit with the high-voltage winding for interrupting the high-voltage circuit upon a predetermined current flow therethrough, fusible links in circuit with each low-voltage phase winding for interrupting the circuit therethrough upon a predetermined current flow therethrough, the protective links in the high-voltage and low-voltage circuits having substantially the same current carrying capacity in terms of per cent full-load current for the respective circuits.

4. A transformer installation comprising, in combination, a transformer having polyphase high-voltage and low-voltage windings, fusible links in circuit with the high-voltage winding for interrupting the high-voltage circuit upon a predetermined current flow therethrough, fusible links in circuit with each low-voltage phase winding for interrupting the circuit therethrough upon a predetermined current flow therethrough, the protective links in the high-voltage and low-voltage circuits having substantially the same current carrying capacity in terms of percent full-load current for the respective circuits, the fusible links being designed to withstand continuous overload current of approximately one-half the value obtained by a three-phase short-circuit at the low-voltage terminals of the transformer.

5. A transformer installation comprising, in combination, a casing, a transformer within said casing having polyphase high-voltage and low-voltage windings, insulating bushings extending through the wall of said casing and through which terminal conductors from the several windings extend, fusible links mounted within the casing in circuit with the high-voltage winding for interrupting the circuit therethrough upon a predetermined current flow therethrough, a circuit breaker within said casing for interrupting the current through the low-voltage windings, low-voltage fusible links within the casing between the circuit breaker and the low-voltage phase windings for interrupting the circuit therethrough upon a predetermined current flow therethrough, and a plurality of devices for controlling the operation of said circuit breaker to its circuit interrupting position including an instantaneous current responsive relay connected to operate in response to the low-voltage winding circuit current, a time delay current responsive relay connected to operate in response to the low-voltage winding circuit current, and a thermal relay responsive to the heating of the transformer apparatus upon continued overload thereof, said plurality of devices being coordinated with respect to time to respond over a predetermined range of overload currents in the order named, the fusible links being designed to withstand continuous overload current of approximately one-half the value obtained by a short-circuit at the low-voltage terminals of the transformer.

6. A transformer installation comprising, in combination, a casing, a transformer within said casing having polyphase high-voltage and low-voltage windings, insulating bushings extending through the wall of said casing and through which terminal conductors from the several windings extend, fusible links mounted within the casing in circuit with the high-voltage winding for interrupting the circuit therethrough upon a predetermined current flow therethrough, a circuit breaker within said casing for interrupting the current through the low-voltage windings, low-voltage fusible links within the casing between the circuit breaker and the low-voltage phase windings for interrupting the circuit therethrough upon a predetermined current flow therethrough, a plurality of devices for controlling the operation of the circuit breaker to its circuit interrupting position including an instantaneous current responsive relay connected to operate in response to the low-voltage winding circuit current, a time delay current responsive relay connected to operate in response to the low-voltage winding circuit current, and a thermal relay responsive to the heating of the transformer apparatus upon continued overload thereof, said plurality of devices being coordinated with respect to time to respond over a predetermined range of overload currents in the order named, the fusible links being designed to withstand for an appreciable time an overload current corresponding to that value obtained by a short circuit at the low-voltage terminals.

7. A transformer installation comprising, in combination, a casing, a transformer within said casing having polyphase high-voltage windings connected in delta relation and low-voltage windings connected in star relation and having a solidly grounded neutral connection, insulating bushings extending through the wall of said casing through which terminal conductors from the several windings extend, fusible links mounted within the casing in circuit with the high-voltage winding for interrupting the circuit therethrough upon a predetermined current flow therethrough, a circuit breaker within said casing for interrupting the current through the low-voltage winding, fusible links within the casing between the circuit breaker and the low-voltage phase windings for interrupting the circuit therethrough upon a predetermined current flow therethrough, and a plurality of devices for controlling the operation of said circuit breaker to its circuit interrupting position including an instantaneous current responsive relay connected to operate in response to the low-voltage winding circuit current, a time delay current responsive relay connected to operate in response to the low-voltage winding circuit current, and a thermal relay responsive to the heating of the transformer apparatus upon continued overload thereof, said plurality of devices being coordinated with respect to time to respond over a predetermined range of overload currents in the order named, the fusible links being designed to withstand continuous overload current of approximately one-half the value obtained by a short circuit at the low-voltage terminals of the transformer, the protective links in the high-voltage and low-voltage circuits having substantially the same current carrying capacity in terms of per cent full-load current for the respective circuits.

8. A transformer installation comprising, in combination, a transformer within said casing having polyphase high voltage windings connected in delta relation and low voltage winding connected in star relation and having a solidly grounded neutral connection, fusible links mounted within the case in circuit with the high voltage winding for interrupting the circuit therethrough upon a predetermined current flow therethrough, a circuit breaker within said casing for interrupting the current through the low voltage windings, fusible links within the casing between the circuit breaker and the low voltage phase windings for interrupting the current therethrough upon a predetermined current flow therethrough, means responsive to low voltage circuit conditions for controlling the operation of said circuit breaker, the protective links in the high voltage and low voltage circuits having substantially the same current carrying capacity in terms of percentage full load current for the respective circuits.

9. A transformer installation comprising, in combination, a transformer within said casing having polyphase high voltage windings connected in delta relation and low voltage winding connected in star relation and having a solidly grounded neutral connection, fusible links mounted within the casing in circuit with the high voltage winding for interrupting the circuit therethrough upon a predetermined current flow therethrough, a circuit breaker within said casing for interrupting the current through the low voltage winding, fusible links within the casing between the circuit breaker and the low voltage phase windings for interrupting the current therethrough upon a predetermined current flow therethrough, and a plurality of devices for controlling the operation of said circuit breaker to its circuit opening position including an instantaneous current responsive relay and a time delay current responsive relay connected to operate in response to low voltage circuit current conditions, the fusible links in the high voltage and low voltage circuits being designed to withstand continuous overload current of the order of six times normal full load current and to fuse at a slight increase of current above that value.

HENRY V. PUTMAN.